United States Patent
Ohmori et al.

(10) Patent No.: US 7,021,421 B2
(45) Date of Patent: Apr. 4, 2006

(54) TRANSPARENT NOISE-BARRIER WALL

(75) Inventors: Masahiro Ohmori, Tochigi (JP); Masayuki Sanbayashi, Toyama (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 602 days.

(21) Appl. No.: 09/875,103

(22) Filed: Jun. 7, 2001

(65) Prior Publication Data
US 2002/0023800 A1 Feb. 28, 2002

Related U.S. Application Data
(60) Provisional application No. 60/240,829, filed on Oct. 17, 2000.

(30) Foreign Application Priority Data
Jun. 7, 2000 (JP) .................................. P2000-171121

(51) Int. Cl.
*B01D 53/54* (2006.01)

(52) U.S. Cl. ...................................... 181/289; 181/294

(58) Field of Classification Search .................. 181/294, 181/289–291; 136/263, 252; 427/244; 435/433; 423/608
See application file for complete search history.

(56) References Cited

U.S. PATENT DOCUMENTS

| | | | | |
|---|---|---|---|---|
| 4,049,848 A | * | 9/1977 | Goodale et al. | 181/294 |
| 5,317,113 A | * | 5/1994 | Duda | 181/285 |
| 6,013,372 A | * | 1/2000 | Hayakawa et al. | 428/411.1 |
| 6,074,732 A | * | 6/2000 | Garnier et al. | 428/215 |
| 6,337,301 B1 | * | 1/2002 | Ohmori et al. | 502/350 |
| 6,444,189 B1 | * | 9/2002 | Wang et al. | 184/6.25 |
| 6,447,123 B1 | * | 9/2002 | Tonar et al. | 359/601 |
| 2001/0036897 A1 | * | 11/2001 | Tsujimichi et al. | 502/1 |

FOREIGN PATENT DOCUMENTS

| | | |
|---|---|---|
| EP | 0 816 466 A1 | 1/1998 |
| EP | 1 083 152 A1 | 3/2001 |
| JP | A-3-263097 | 11/1991 |
| JP | 11-081250 A | 3/1999 |
| JP | 11-100526 A | 4/1999 |
| JP | 2000-086933 A | 3/2000 |
| JP | A-2000-95521 | 4/2000 |

\* cited by examiner

*Primary Examiner*—Marlon T. Fletcher
*Assistant Examiner*—David S. Warren
(74) *Attorney, Agent, or Firm*—Sughrue Mion, PLLC

(57) ABSTRACT

An object of the present invention is to provide a transparent noise-barrier wall which is slow to foul, easy to clean even when fouled, and capable of maintaining these effects over a long period of time. The transparent noise-barrier wall has brookite titanium dioxide substantially existing on the surface. The titanium dioxide particles preferably contain about 20% by mass or more of brookite titanium dioxide.

46 Claims, No Drawings

TRANSPARENT NOISE-BARRIER WALL

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/240,829 filed Oct. 17, 2000 pursuant to 35 U.S.C. §111(b).

FIELD OF THE INVENTION

The present invention relates to a high-transparency noise-barrier wall capable of insulating or absorbing noises, which is used on the roadside or wayside of a road or railway having traffic. More specifically, the present invention relates to a transparent noise-barrier wall where titanium dioxide particles comprising brookite crystal are allowed to exist on the surface, and also relates to a noise-barrier panel and a process for producing the wall.

BACKGROUND OF THE INVENTION

Recently, installing a noise-barrier wall using a material having high transparency (hereinafter simply referred to as a "transparent noise-barrier wall") on the roadside or wayside of a road or railway by taking the right to sunlight into account is increasing in urban areas. In addition, from the viewpoint that conventional opaque materials, such as metal plate, disadvantageously impair appearance, replacement with a transparent material is proceeding. The transparent material widely used at present is a molded article of polycarbonate resin or acrylic resin out of plastic materials, because of its high strength.

This high-transparency noise-barrier wall is; however, gradually contaminated by exhaust gas from a car or a train running on the road or railroad, or by floating powder or dust in air. Therefore, a cleaning operation must be periodically performed to maintain the transparency. For maintaining the transparency of the transparent noise-barrier wall, a cleaning method by a human is most effective; however, this cleaning operation requires complete or partial closing of the road or railroad for a period of time, which is costly. Furthermore, this method has many limitations, for example, the cleaning operation cannot be performed frequently in view of traffic safety.

Titanium dioxide is widely known to have a photocatalytic function and actually, is being applied to various uses by using its antifouling, deodorizing or antimicrobial effect, and many applications thereof have been disclosed. Among these photocatalytic functions of titanium oxide, the antifouling function is used for maintaining the transparency of transparent noise-barrier walls using a polycarbonate resin or acrylic resin substrate. More specifically, a technique of allowing titanium dioxide to exist on the surface of a noise-barrier wall and to decompose the fouling component, where the surface is hydrophilized, is disclosed, for example, in JP-A-11-81250 (the term "JP-A" as used herein means an "unexamined published Japanese patent application"), JP-A-10-37135 and JP-A-10-305091. As a result, the fouling component is easily cleaned by rainfall or the like. The titanium dioxide used in these techniques is titanium dioxide comprising anatase crystal. As such, the photocatalytic function of titanium dioxide comprising anatase crystal is widely known and is being applied to the above-described antifouling, deodorizing and antimicrobial uses, and many applications thereof have been disclosed.

This titanium dioxide comprising anatase crystal is known to have effects of photocatalytically decomposing the fouling component and hydrophilizing the surface; however, these functions are not sufficiently high. More specifically, the effect attributable to the photocatalytic reaction of the photocatalytic member applied using titanium dioxide comprising anatase crystal cannot be fully achieved in places under insufficient light irradiation (for example, in the shade such as shadow of a building) or during winter season under weak sunlight. In other words, the photocatalytic reaction effect can be utilized only in places exposed to light having sufficiently high intensity (for example, in the daytime of summer or under a lamp of artificially irradiating ultraviolet ray).

SUMMARY OF THE INVENTION

As such, conventional transparent noise-barrier walls using the above-described titanium dioxide comprising anatase crystal have problems in that the photochemical decomposition of the fouling component proceeds insufficiently in a place under irradiation of poor light, the surface of the noise-barrier wall is not sufficiently hydrophilized (as defined by the contact angle to water), the whole substrate surface is not satisfactorily wetted even under exposure to rainfall, washing water or water vapor, a sufficiently high self-cleaning effect is not attained, and the contamination gradually accumulates to decrease the transparency.

Under these circumstances, the present invention has been made to solve the above-described problems and an object of the present invention is to provide a transparent noise-barrier wall having excellent light transmittance, facilitated in self-cleaning of, if any, contamination, and ensured with duration of these effects for a long period of time.

As a result of extensive investigations, the present invention has been accomplished and provides a transparent noise-barrier wall which can be easily cleaned by exposure to rainfall or water vapor or by manual water washing when the transparency is impaired due to fouling. The present invention also provides a transparent noise-barrier wall and related inventions thereof, which can ensure longer duration of this antifouling effect than in the case of conventional titanium dioxides containing no brookite crystal but comprising only anatase crystal.

More specifically, the present invention provides:

(1) A transparent noise-barrier wall comprising titanium dioxide particles comprising brookite titanium dioxide, wherein the brookite titanium dioxide is allowed to substantially exist on the surface.

(2) The transparent noise-barrier wall as described in 1 above, wherein the titanium dioxide particles comprise about 20% by mass or more of brookite titanium dioxide.

(3) The transparent noise-barrier wall as described in 1 above, wherein the titanium dioxide particles comprise about 50% by mass or more of brookite titanium dioxide.

(4) The transparent noise-barrier wall as described in 1 above, wherein the titanium dioxide particles comprise 100% by mass of brookite titanium dioxide.

(5) The transparent noise-barrier wall as described in any one of 1 to 3 above, wherein the titanium dioxide particle comprises brookite crystal and at least one selected from the group consisting of rutile crystal and anatase crystal.

(6) The transparent noise-barrier wall as described in any one of 1 to 4 above, wherein the titanium dioxide particles are fixed to the surface together with a binder material.

(7) The transparent noise-barrier wall as described in any one of 1 to 4 above, wherein the coating layer comprising the titanium dioxide particles and a binder material has a thickness of about 0.005 μm or more.

(8) The transparent noise-barrier wall as described in any one of 1 to 4 above, wherein the coating layer has a thickness of about 0.005 to about 10 μm.

(9) The transparent noise-barrier wall as described in any one of 1 to 4 above, wherein the surface layer having allowed brookite titanium dioxide to substantially exist on the surface thereof has a contact angle to water of about 10° or less with a light intensity of 3.5 to 0.005 mW/cm$^2$.

(10) The transparent noise-barrier wall as described in any one of 1 to 4 above, wherein the surface layer having allowed brookite titanium dioxide to substantially exist on the surface thereof has a property such that the total light transmittance after a contamination cleaning test is about 86% or more.

(11) The transparent noise-barrier wall as described in any one of 1 to 4 above, wherein the substrate of the transparent noise-barrier wall comprises an acrylic resin or a polycarbonate resin.

(12) The transparent noise-barrier wall as described in any one of 1 to 4 above, wherein the titanium dioxide particles are fixed to the surface together with a binder material having at least one metal element-oxygen element bond selected from Si—O bond, Ti—O bond, Al—O bond, Zr—O bond, Ca—O bond and Mg—O bond.

(13) The transparent noise-barrier wall as described in any one of 1 to 4 above, wherein the brookite titanium dioxide is fixed onto the surface of the resin substrate through an undercoat material.

(14) A soundproof panel unit which constitutes the transparent noise-barrier wall described in any one of 1 to 4 above.

(15) A method for producing a transparent noise-barrier wall having a photocatalytic activity, comprising coating a coating agent of titanium dioxide particles containing about 20% by mass or more of brookite titanium dioxide on the surface of the substrate of a transparent noise-barrier wall.

(16) The method for producing a transparent noise-barrier wall having a photocatalytic activity as described in 15 above, wherein the substrate of the transparent noise-barrier wall is an acrylic resin or a polycarbonate resin.

(17) The transparent noise-barrier wall as described in 9 above, wherein the contact angle to water 96 hours after irradiation is about 10° or less.

(18) The transparent noise-barrier wall as described in any one of 1 to 4 above, wherein a surface layer having brookite titanium dioxide has a property such that the haze value after a contamination cleaning test is from 0% to about 10%.

(19) The transparent noise-barrier wall as described in 9 above, wherein the transparent noise-barrier wall has a property such that change of the yellowness index after an artificially accelerated exposure test by sunshine-type carbon arc for 3000 hours is about 7 or less.

DESCRIPTION OF THE PRESENT INVENTION

The present invention is described in detail below.

The above-described objects of the present invention can be attained by a transparent noise-barrier wall having on the surface thereof titanium dioxide particles comprising brookite crystal or particles of brookite titanium dioxide, wherein brookite titanium dioxide is allowed to substantially exist on the surface. The term "substantially" as used herein means that brookite titanium dioxide is fixed onto the surface of a resin substrate and allowed to exist in such a state that the titanium dioxide surface is exposed to atmosphere. For example, in the case of the titanium dioxide particles comprising brookite crystal, the content thereof is preferably about 20% by mass or more, more preferably about 50% by mass or more (including 100%).

The construction material of the transparent noise-barrier wall is preferably produced from polycarbonate or acrylic resin. The titanium dioxide particle is preferably allowed to exist on the outermost surface of the noise-barrier wall substrate using an inorganic binder. At this time, an inorganic undercoat layer is preferably interposed between the noise-barrier wall and the titanium dioxide particles to prevent the noise-barrier wall from directly contacting the titanium dioxide particles.

JP-A-11-100526 discloses a technique related to a member where brookite crystal is present in the surface layer. However, the contents described in the specification and Examples thereof are the same as conventionally known functions attributable to the anatase crystal. The invention is different from the present invention in that the difference between the titanium dioxide comprising brookite crystal and the titanium dioxide not comprising brookite crystal, in other words, comprising anatase crystal titanium dioxide, is clearly verified.

The substrate for use in the transparent noise-barrier wall of the present invention is preferably formed of polycarbonate resin or acrylic resin and may also contain, if desired, a reinforcing material or the like. The substrate is preferably large in size so that the number of a prop or the like which blocks the light can be few. The acrylic resin for use in the present invention means a resin starting from a methacrylate-type polymer, more specifically, a resin worked into a plate using this starting material by molding or casting or a modified resin thereof improved in flame resistance or impact resistance.

Examples thereof include Plexiglas SE-3, Plexiglas (both produced by Rohm & Haas Inc.), Acrylite FR, Acrylite MR, Acrypet IR (all produced by Mitsubishi Rayon Co., Ltd.) and Paraglass NF (manufactured by Kuraray Co., Ltd.). The polycarbonate resin means a thermoplastic resin starting from a dioxy compound (e.g., bisphenol) or from a diallyl carbonate and examples thereof include Iupilon, Novarex (both produced by Mitsubishi Engineering-Plastic Corp.) and Panlite (manufactured by Teijin Chemicals Ltd.)

The titanium dioxide particle for use in the present invention means titanium dioxide comprising brookite crystal and capable of undertaking a photocatalytic reaction using an ultraviolet ray and exerting there high photocatalytic activity even under weak light, which cannot be brought out by the anatase crystal. By using this titanium dioxide particle as a photocatalytic medium of the transparent noise-barrier wall, the above-described problems are solved and an outstanding effect is provided, particularly in the environment under irradiation of weak light.

Specifically, for example, a thin film containing the above-described titanium dioxide particles is formed on a transparent resin, and an ultraviolet ray at 365 nm is irradiated thereon for 120 minutes in an environment of weak light irradiation at an intensity of 0.1 to 0.005 mW/cm$^2$. As a result, the contact angle to water dropped on the surface thereof becomes about 10° or less, so that the photocatalytic activity or hydrophilization can be exerted even in the environment under very weak light.

The titanium dioxide particles comprising brookite crystal for use in the present invention may be titanium dioxide particles comprising only brookite crystal or may be a mixed crystal or mixture system containing a rutile or anatase titanium dioxide particle. In the case where a rutile or anatase titanium dioxide particle is contained, the ratio of the brookite titanium dioxide particle in the titanium dioxide particle is not particularly limited, but generally from about 1 to 100% by mass, preferably from 10 to 100% by mass, more preferably from about 50 to 100% by mass. This is because the brookite titanium dioxide is superior in photocatalytic activity to the rutile or anatase titanium dioxide.

Examples of the process for producing titanium dioxide particles comprising brookite crystal include a vapor phase process of heat-treating titanium dioxide particles of anatase crystal to obtain titanium dioxide particles comprising brookite crystal, and a liquid phase process of neutralizing or hydrolyzing a solution of titanium compound such as titanium tetrachloride, titanium trichloride, titanium alkoxide and titanium sulfate, to obtain a titanium dioxide sol having dispersed therein titanium dioxide particles comprising brookite crystal.

These processes are not particularly limited as long as titanium dioxide particles comprising brookite crystal can be obtained. However, in view of photocatalytic activity and handleability of the substance obtained and taking into account the transparency, adhesive property and hardness of a titanium dioxide thin film when it is formed, the processes described in the Examples of the present invention are preferred.

More specifically, preferred processes are a process where titanium tetrachloride is added to hot water of about 75 to about 100° C., the titanium tetrachloride is hydrolyzed while controlling the chloride ion concentration at a temperature of from about 75° C. to the boiling point of the solution, preferably from about 90 to about 95° C., and thereby obtaining titanium dioxide particles comprising brookite crystal in the form of a titanium dioxide sol, and a process where titanium tetrachloride is added to water containing either one or both of nitrate ion and phosphate ion, the titanium tetrachloride is hydrolyzed while controlling the total concentration of chloride ion, nitrate ion and phosphate ion at a temperature of from about 75° C. to the boiling point of the solution, more preferably from about 90 to about 95° C., and thereby obtaining titanium dioxide particles comprising brookite crystal in the form of a titanium dioxide sol.

The titanium dioxide particles comprising brookite crystal are not particularly limited in size; however, the average particle size thereof is preferably about 0.005 µm or more, more preferably from about 0.005 to about 0.1 µm, even more preferably from about 0.01 to about 0.05 µm. This is because if the average particle size exceeds 0.1 µm, the photocatalytic activity decreases and the effects, such as fouling is hard to occur or the organic substance can be easily decomposed to clean the fouling even if fouled, may not be obtained. Moreover, the transparency of titanium dioxide particle decreases, and if such titanium dioxide particles are allowed to exist on the surface of a transparent noise-barrier wall, the color of the titanium dioxide particle disadvantageously affects the color of the transparent noise-barrier wall. If the average particle size is less than about 0.005 µm, handling in the production process becomes difficult. The specific surface area of the titanium dioxide particle is preferably about 20 $m^2/g$ or more.

The thus-obtained titanium dioxide particles may be allowed to exist on the surface of a transparent noise-barrier wall by a method so that a titanium dioxide particle sol is coated on a transparent noise-barrier wall, dried and then heat-treated to fix the titanium dioxide particles to the surface of the transparent noise-barrier wall or by a method so that titanium dioxide particle is mixed with a coating material or the like, coated on a transparent noise-barrier wall, dried and then heat-treated. However, when the substrate is a material having heat resistance that is not so high, such as polycarbonate resin or acrylic resin, a method of mixing titanium dioxide particles comprising brookite crystal intact with a binder or the like to prepare a coating agent of titanium dioxide particles comprising brookite crystal, applying this coating solution, thereby fixing the titanium dioxide particles on the transparent noise-barrier wall is more preferred.

The binder may be sufficient if it increases the adhesion strength between the transparent noise-barrier wall and titanium dioxide particles in the coating solution of titanium dioxide particles comprising brookite crystal, thereby improving the film hardness. By using such a binder, the titanium dioxide particles can be prevented from dropping off from the transparent noise-barrier wall and the effect of retarding the fouling and of facilitating the cleaning, if fouled, can be maintained for a long period of time.

The kind of binder or binder precursor that can be used in the present invention varies depending on the construction material used for the transparent noise-barrier wall, but, for example, a metal oxide containing a metal element-oxygen element bond, such as Si—O bond, Ti—O bond, Al—O bond, Zr—O bond, Ca—O bond and Mg—O bond, may be used. In the case of a binder precursor, an alkoxide containing the above-described metal is preferred because the fixing property and film strength are elevated.

More preferred are binder precursors, such as alkoxide of silicon (e.g., tetramethoxysilane, tetraethoxysilane), alkoxide of titanium and acetate of titanium, and binders, such as chelate of titanium. The alkoxide of silicon, such as tetramethoxysilane and tetraethoxysilane, forms polysiloxane or organopolysiloxane upon condensation and functions as a binder.

More specific preferred examples thereof include tetramethoxysilane, tetraethoxysilane, tetrapropoxysilane (tetrapropyloxysilane), tetrabuthoxysilane, diethoxydimethoxysilane, methyltrimethoxysilane, methyltriethoxysilane, methyltripropoxysilane (methyltripropyloxysilane), ethyltrimethoxysilane, ethyltriethoxysilane, ethyltripropoxysilane (ethyltripropyloxysilane), phenyltrimethoxysilane, phenyltriethoxysilane, dimethyldimethoxysilane, diethyldimethoxysilane, phenylmethyldimethoxysilane, n-propyltrimethoxysilane, γ-glycoxidoxypropyltrimethylsilane and γ-acryloxypropyltrimethoxysilane. Partial hydrolysates and dehydrocondensation polymerization products of these substances may be also used.

The method for applying the coating agent of titanium dioxide particles comprising brookite crystal onto a transparent noise-barrier wall is not particularly limited and any known method may be used, such as spin coating method, flow coating method, dip coating method, spray coating method, bar coating method, roller coating method, brush coating method and soaking method. Among these, a spray coating method and a roller coating method are preferred because the substrate is large.

When coating, the coating agent of titanium dioxide particles comprising brookite crystal on the surface of a substrate for the transparent noise-barrier wall and drying the solution to fix the titanium dioxide particles to the surface, a dispersant or surfactant may be added to the coating agent depending on the coating conditions. The transparent noise-barrier wall is preferably subjected to an undercoat treatment of a binder comprising an inorganic material to form an undercoat layer of the inorganic material. Examples of the inorganic undercoat material include known hard-coat materials for plastics, such as Si-, Ti-, Zr- or Al-containing material. When using an Si-containing material, a single binder for use in the present invention can be served to this effect.

With respect to the shape of titanium dioxide particles comprising brookite crystal according to the present invention, the particles are, for example, present on the adhering surface almost in the block form. The surface thereof is covered with oxygen or a hydroxyl group in air. The silicon oxide for forming a silanol bond or a precursor thereof, or the metal oxide having a hydroxyl group on the surface or a precursor thereof, which are used as a binder, is condensed with titanium dioxide, thereby firmly bonding to both the transparent noise-barrier wall and the surface of titanium dioxide particle. Therefore, even with a small amount of binder, an excellent adhesive strength can be effectively brought out.

When a thin film of titanium dioxide comprising brookite crystal is formed using such a binder or binder precursor, the hardness thereof is, in terms of pencil hardness, about 3H or more when using silicon oxide, titanium dioxide or a precursor thereof. That is, a film having sufficiently high film hardness and difficult of dropping off is formed.

These binders or binder precursors may be used individually or as a mixture of two or more thereof. When these are used as a mixture, the mixing ratio may be freely selected. When adding a binder or a binder precursor, the amount added thereof is generally from about 5 to about 50% by mass as calculated in terms of an oxide, based on the titanium dioxide. If the amount added exceeds about 50% by mass, the ratio of titanium dioxide particles buried in the binder increases and the photocatalytic activity of the coating decreases. If it is less than about 5% by mass, the effect of the binder cannot be obtained and the titanium dioxide particles disadvantageously drop off.

The method for adding a binder or binder precursor is not particularly limited but examples thereof include a method of adding a binder or binder precursor to a sol having dispersed therein titanium dioxide particles comprising brookite crystal and then coating the sol on a transparent noise-barrier wall, and a method of spray-coating a titanium dioxide sol and at the same time, coating a binder or binder precursor using another spray.

In the case of coating a coating agent of titanium dioxide particles comprising brookite crystal on a transparent noise-barrier wall and then drying the solution, an appropriate solvent may be added as a leveling agent to increase the drying speed or to elevate the smoothness of the thin film. When the titanium dioxide particles comprising brookite crystal are dispersed in water, a hydrophilic organic solvent such as ethyl alcohol, iso-propyl alcohol and n-butyl alcohol is usually used.

After a coating agent of titanium dioxide particles comprising brookite crystal is coated on a transparent noise-barrier wall having formed thereon a protect film, drying is performed to fix the titanium dioxide particles to the surface. The atmosphere during drying is not particularly limited and drying may be performed in air, in a vacuum or in an inert gas, but is usually performed in air. The drying temperature varies depending on the construction material of the transparent noise-barrier wall and the kind of the binder or binder precursor, but is usually from about 20 to about 100° C. The drying time is usually from about 5 minutes to about 60 hours, preferably from about 15 minutes to about 24 hours. If desired, a forced drying method using a dryer or the like may also be used.

In the thus-obtained transparent noise-barrier wall where titanium dioxide particles comprising brookite crystal exist on the surface, the thin film, in which the titanium dioxide is present, preferably has a thickness of about 0.005 μm or more, more preferably from about 0.005 to about 10 μm, and even more preferably from about 0.01 to about 5 μm. If the thickness is less than about 0.005 μm, the photocatalytic activity or hydrophilicity is not sufficiently high. If it exceeds about 10 μm, the photocatalytic reaction takes place only near the surface of the titanium dioxide thin film, and as a result, titanium dioxide particles not participating in the photocatalytic reaction increase, which is not economically advantageous. Moreover, these particles readily drop off from the transparent noise-barrier wall and also, the transparency of transparent noise-barrier wall disadvantageously decrease.

The transparent noise-barrier wall having titanium dioxide particles comprising brookite crystal existing on the surface of the present invention decomposes the adhered contamination by the photocatalytic function of titanium dioxide particles comprising brookite crystal, which has activity higher than that of anatase crystal. In addition, the titanium dioxide thin film formed from a coating agent of titanium dioxide particles containing brookite crystal has excellent hydrophilicity and the contact angle thereof to water is 10° or less even under light having a low intensity (the light intensity is in the range from 0.1 to 0.005 $mW/cm^2$), so that contamination, such as dust in air, exhaust gas from automobiles and dust from braking of trains is retarded from adhering to the transparent noise-barrier wall and the contamination can be easily cleaned even if fouled.

Furthermore, the film formed from a coating agent of titanium dioxide particles comprising brookite crystal also has excellent transparency and does not affect the color of the transparent noise-barrier wall. In addition, the film is firmly bonded to the surface of the protect layer formed on the noise-barrier wall surface by virtue of the binder or binder precursor. As a result, the film can be favored with excellent film hardness and retarded from dropping off, and the above-described effect of the titanium dioxide particles comprising brookite crystal of the present invention can be maintained for a long period of time.

The contamination cleaning test is a test performed for evaluating the cleaning aptitude of the photocatalyst. In the present invention, the noise-barrier wall is fouled by an exhaust gas from a diesel car while idling and then an ultraviolet ray is irradiated thereon with a predetermined light intensity to decompose the organic components by the photocatalytic reaction, thereby providing a state so that the fouling is lifted. Thereafter, cleaning with a predetermined amount of shower water (corresponding to rainfall) is performed and the degree of decontamination, namely, the maintenance of transparency, is evaluated.

Such an effect is not attained by conventional titanium dioxide particles mainly comprising anatase crystal but not containing brookite crystal, and this is considered to occur for the following reasons. The crystal structure of titanium dioxide is fundamentally constructed by a combination of units each comprising one titanium atom and six oxygen atoms surrounding the titanium atom. The photocatalytic reaction of titanium dioxide is said to take place upon exchange of electrons between the titanium atom and the oxygen atom. Therefore, the bonding state of the titanium atom to oxygen atoms (six bonds) is expected to have a great effect on the photocatalytic activity.

As a result of structural analysis of crystals, it has been verified that in both the anatase crystal and the rutile crystal, those six bonds are constituted by two pairs of bond distances. More specifically, the anatase crystal has a titanium-oxygen bonding state such that two bonds have a bond distance of 1.9656 Å and four bonds have a bond distance of 1.9370 Å, and the rutile crystal has a titanium-oxygen bonding state such that two bonds have a bond distance of 1.9834 Å and four bonds have a bond distance of 1.9462 Å. In other words, the bonding state has a very high symmetry.

On the other hand, in the brookite crystal obtained by the present invention, these six bonds all are different and six bond distances are present. The minimum is 1.8651 Å and the maximum is 2.0403 Å. As a result, there is no symmetry and it is estimated that all bonds participate in the photocatalytic function and very high activity is revealed.

In the transparent noise-barrier wall of the present invention, as described above, the brookite crystal used has a capability of exerting effective photocatalytic activity and hydrophilization effect even under irradiation of weak light. At the same time, the substrate of the noise-barrier wall is a resin having high transparency so that the titanium dioxide particles can undertake a photocatalytic reaction even by light indirectly irradiated from the inside of the resin, and bring about unexpected and excellent effects including the long-term duration.

EXAMPLES

The present invention is described in greater detail below by referring to the Examples, however, the present invention should not be construed as being limited thereto. Unless indicated otherwise herein, all parts, percents, ratios and the like are by weight.

Example 1

Into a glass reaction tank having a content volume of 1.5 L and equipped with a reflux condenser and a stirring blade, 945 mL of distilled water previously heated to 95° C. was charged. Thereafter, while rotating the stirring blade at about 200 rpm and keeping the liquid temperature in the tank at 95° C., 56 g of an aqueous titanium tetrachloride solution (Ti content: 14.3% by mass, specific gravity: 1.5 g/cm$^3$) was gradually added dropwise to the reaction tank over about 1 hour. With the progress of the dropwise addition, the solution within the tank started gradually hydrolyzing and the whole liquid became a turbid sol.

After the completion of dropwise addition, the solution was heated near the boiling point (104° C.) and kept at the same temperature for 1 hour to completely hydrolyze the titanium tetrachloride. The concentration of the thus-obtained sol was measured and found to be 2% by mass in terms of titanium dioxide. The obtained sol was cooled and concentrated and the chlorine generated by the hydrolysis was removed by the electrodialysis using an electrodialyser Model G3 manufactured by Asahi Kasei Corp. to obtain an aqueous dispersion titanium dioxide sol having a pH of 4.0 (chloride ion: about 400 ppm, titanium dioxide concentration: 20% by mass). The particles in the sol were observed through a transmission electron microscope, and as a result, the particles had a particle size of 0.01 to 0.02 μm.

In order to examine the crystal structure of titanium dioxide particles contained in the sol, the sol was dried in a vacuum dryer at 60° C. and the obtained titanium dioxide particles were analyzed by X-ray diffraction. The X-ray diffraction was performed using an X-ray diffraction analyzer (RAD-B Rotor Flex, manufactured by Rigaku Corp.) and a Cu bulb. As a result, a peak of 2θ=30.8° indicating the diffraction of the (121) face of brookite crystal was detected. The peaks indicating rutile and/or anatase crystals were not detected.

Tetramethoxysilane as a silicone-containing adhesive was added to coat the water dispersion titanium dioxide sol comprising brookite titanium dioxide obtained above, and ethyl alcohol was added to improve the drying speed, thereby preparing a photocatalytic coating material having the composition shown in Table 2.

Manufacture of Transparent Noise-Barrier Wall:

A transparent noise-barrier wall was manufactured from acrylic resin. This noise-barrier wall panel had a size of 2 m (height)×4 m (width)×15 mm (thickness) (reinforced by inserting a metal mesh into the inside to improve the strength). In order to prevent the noise-barrier wall from deteriorating due to the photocatalytic action of titanium dioxide, a protective film was formed on the noise-barrier wall. More specifically, Tosguard 510 produced by GE Toshiba Silicones was diluted with isopropyl alcohol and spray-coated to form a film having a film thickness of 150 nm in terms of $SiO_2$.

On this protective film, about 200 mL of the coating material shown in Table 2 was spray-coated and dried by leaving it in an atmosphere for 24 hours to manufacture a transparent noise-barrier wall having allowed titanium dioxide particles comprising brookite crystal to exist on the surface. At this time, the layer of titanium dioxide particles comprising brookite crystal had a thickness of 200 nm.

Example 2

Titanium tetrachloride was hydrolyzed in the same manner as in Example 1, except that before adding the aqueous titanium tetrachloride solution, hydrochloric acid was added to the reaction tank in a concentration of 1 mol/L as HCl. The obtained sol was treated in the same manner as in Example 1 to obtain a water dispersion titanium dioxide sol. The particles in the sol were observed in the same manner as in Example 1, and as a result, the particles had a particle size of 0.01 to 0.03 μm.

The crystal structure of titanium dioxide particles contained in this sol was examined in the same manner as in Example 1. As a result, a peak indicating the diffraction of (121) face of brookite crystal, and a peak indicating the diffraction of (110) face, which is a main peak of rutile crystal, were detected. Also, a peak indicating the diffraction of (004) face of anatase crystal was detected. Accordingly, the obtained sol was a mixture containing brookite, anatase and rutile crystals. The contents of these crystals were calculated as follows.

The brookite, anatase and rutile crystals of titanium dioxide each had an X-ray diffraction peak shown in Table 1 (extracted from JCPDS card) and as seen from the d value thereof, these crystals overlap in the major part. Particularly, the main peak d values of the brookite and the anatase crystals are 3.51 Å and 3.52 Å, respectively, the brookite crystal has a peak also at 3.47 Å, revealing that these three peaks substantially overlap.

As such, the intensity ratio of main peaks between the brookite crystal and the anatase crystal cannot be obtained. Therefore, in the present invention, a peak of (121) face of the brookite crystal, which does not overlap the peak of anatase crystal, was used and the intensity ratio of the peak at the position where those three peaks overlap (peak intensity of (121) face of brookite crystal)/(peak intensity at the position having the overlap of three peaks) was determined. From the value obtained, the contents of brookite titanium dioxide and anatase titanium dioxide were determined. With respect to the rutile crystal, the content thereof was obtained from the intensity ratio of the peak indicating the diffraction of (110) face as the main peak of the rutile crystal to the peak at the position where those three peaks overlap (main peak intensity of rutile crystal)/(peak intensity at the position having the overlap of three peaks).

As a result, (peak intensity of (121) face of brookite crystal)/(peak intensity at the position having the overlap of three peaks) was 0.38 and (main peak intensity of rutile crystal)/(peak intensity at the position having the overlap of three peaks) was 0.05. From these, it was known that the sol contained about 70% by mass of brookite crystal, about 1.2% by mass of rutile crystal and about 28.8% by mass of anatase crystal.

To the thus-obtained aqueous dispersion titanium oxide sol comprising brookite crystal titanium dioxide, ethyl alcohol was added to improve the drying speed and a photocatalytic coating material having the composition shown in Table 2 was prepared.

A transparent noise-barrier wall (noise-barrier wall panel) having allowed titanium dioxide particles to exist on the surface thereof was manufactured in the same manner as in Example 1, except for using the photocatalytic coating material obtained above.

Example 3

A transparent noise-barrier wall was manufactured by an extrusion molding method. The size was 1 m (height)×2 (width)×5 mm (thickness). Into the inside of this molded polycarbonate resin, a material for increasing the strength was not particularly inserted.

A transparent noise-barrier wall having allowed titanium dioxide particles comprising brookite crystal to exist on the surface thereof was manufactured in the same manner as in Example 1, except for using the transparent noise-barrier wall obtained above.

Example 4

A transparent noise-barrier wall having allowed titanium dioxide particles comprising brookite crystal to exist on the surface thereof was manufactured in the same manner as in Example 3, except for using the photocatalytic coating material prepared in Example 2 (shown in Table 2).

Comparative Example 1

A transparent noise-barrier wall having allowed titanium dioxide particles to exist on the surface thereof was manufactured in the same manner as in Example 1, except that a coating material (shown in Table 2) prepared using a titanium dioxide sol (STS-02, produced by Ishihara Sangyo Kaisha Ltd.) not containing brookite crystal but comprising anatase crystal, where (peak strength of (121) face of brookite crystal)/(peak intensity at the position having the overlap of three peaks)=0 and (main peak intensity of rutile crystal)/(peak intensity at the position having the overlap of three peaks)=0, was used in place of the titanium dioxide particles comprising brookite crystal.

Comparative Example 2

A transparent noise-barrier wall having allowed titanium dioxide particles to exist on the surface thereof was manufactured in the same manner as in Example 1, except that a coating material (shown in Table 2) prepared using a titanium dioxide sol (P-25, produced by Nippon Aerosil) not containing brookite crystal but comprising anatase crystal and rutile crystal, where (peak strength of (121) face of brookite crystal)/(peak intensity at the position having the overlap of three peaks)=0 and (main peak intensity of rutile crystal)/(peak intensity at the position having the overlap of three peaks)=0.16 was used in place of the titanium dioxide particles comprising brookite crystal.

TABLE 1

| Brookite (29-1360) | | | Anatase (21-1272) | | | Rutile (21-1276) | | |
|---|---|---|---|---|---|---|---|---|
| d Value, Å | Crystal Face | Intensity Ratio | d Value, Å | Crystal Face | Intensity Ratio | d Value, Å | Crystal Face | Intensity Ratio |
| 3.51 | 120 | 100 | 3.52 | 101 | 100 | 3.25 | 110 | 100 |
| 2.90 | 121 | 90 | 1.89 | 200 | 35 | 1.69 | 221 | 60 |
| 3.47 | 111 | 80 | 2.38 | 004 | 20 | 2.49 | 101 | 50 |

TABLE 2

| Examples and Comparative Examples | TiO$_2$, Mass % | Crystal* | Tetramethoxy-Silane as SiO$_2$, mass % | Ethyl Alcohol, mass % | Kind of Substrate |
|---|---|---|---|---|---|
| Example 1 | 3.5 | B | 0.7 | 75 | acryl |
| Example 2 | 3.0 | B + A + R | 0.5 | 75 | acryl |
| Example 3 | 2.0 | B | 0.5 | 75 | polycarbonate |
| Example 4 | 1.5 | B + A + R | 0.3 | 75 | polycarbonate |
| Comparative Example 1 | 3.5 | A | 0.7 | 75 | acryl |
| Comparative Example 2 | 3.5 | A + R | 0.7 | 75 | acryl |

*A: anatase crystal, B: brookite crystal, C: rutile crystal.

Evaluation of Noise-Barrier Wall of Present Invention
<Contact Angle to Water>

The transparent noise-barrier walls obtained in the Examples and the Comparative Examples above were measured with respect to contact angle. In the measurement, Model CA-D manufactured by Kyowa Interface Science Co., Ltd. was used, an ultraviolet ray having a light intensity of 0.3 mW/cm$^2$ at 365 nm was irradiated for 120 minutes, and the contact angle to water was measured before, imme diately after and 96 hours after the irradiation. The results are shown in Table 3.

TABLE 3

| Examples and Comparative Examples | Contact Angle to Water | | |
|---|---|---|---|
| | Before Irradiation | Immediately after Irradiation | 96 hours after Irradiation |
| Example 1 | 14° | 5° | 6° |
| Example 2 | 18° | 7° | 9° |
| Example 3 | 17° | 6° | 8° |
| Example 4 | 20° | 8° | 9° |
| Comparative Example 1 | 25° | 18° | 23° |
| Comparative Example 2 | 22° | 15° | 19° |

<Cleaning Aptitude>

Then, the transparent noise-barrier walls obtained in the Examples and the Comparative Examples above were measured on the cleaning aptitude. An exhaust gas from a diesel car while idling was sprayed on each of the transparent noise-barrier walls obtained in the Examples and the Comparative Examples above to provide a fouled surface state. After irradiating an ultraviolet ray (light intensity at 365 nm: 0.3 mW/cm$^2$) on each noise-barrier wall for 1 hour, 5 L or 1 L of shower water at a temperature of 20° C. was poured on the transparent noise-barrier wall and the degree of cleaning of the contamination was visually evaluated. Also, the above-described fouling-cleaning step was repeated 10 times and then the degree of cleaning was evaluated in the same manner. The results obtained are shown in Table 4.

TABLE 4

| Examples and Comparative Examples | Degree of Cleaning, 5 L | Degree of Cleaning, 1 L | Degree of Cleaning After 10 Times Repetition, 5 L | Degree of Cleaning After 10 Times Repetition, 1 L |
|---|---|---|---|---|
| Example 1 | ○ | ○ | ○ | Δ |
| Example 2 | ○ | ○ | ○ | Δ |
| Example 3 | ○ | ○ | ○ | Δ |
| Example 4 | ○ | ○ | ○ | Δ |
| Comparative Example 1 | Δ | X | X | X |
| Comparative Example 2 | X | X | X | X |

○: The contamination is quickly cleaned.
Δ: The contamination is slightly difficult to clean.
X: The contamination cannot be cleaned.

<Maintenance of Transparency>

The transparent noise-barrier walls obtained in the Examples and the Comparative Examples were evaluated on maintenance of transparency. More specifically, the light transmittance (wavelength region: 450 to 700 nm) was measured after the above-described 10 times repetition in the case of 5 L shower water in the evaluation of cleaning aptitude and also immediately after the production of the noise-barrier wall. In the measurement, a haze meter Model TC-HIII DP manufactured by Tokyo Denshoku Co., Ltd. was used and the total light transmittance and haze value were determined according to the JIS K6718 measuring method. The results are shown in Table 5.

TABLE 5

| Examples and Comparative Examples | Total Light Transmittance (%), | | Haze Value (%) | |
|---|---|---|---|---|
| | Immediately after Production | After 10 Times Cycle | Immediately after Production | After 10 Times Cycle |
| Example 1 | 93 | 92 | 0.2 | 0.2 |
| Example 2 | 92 | 90 | 0.3 | 0.5 |
| Example 3 | 91 | 89 | 1.6 | 1.7 |
| Example 4 | 88 | 86 | 0.8 | 1.0 |
| Comparative Example 1 | 93 | 80 | 6.9 | 17.2 |
| Comparative Example 2 | 85 | 65 | 9.3 | 20.6 |

<Water Proof>

The transparent noise-barrier walls obtained in the Examples were evaluated on weather proof. The transparent noise-barrier walls were exposed to sunshine weather meter Model WEL-SUN-DC manufactured by Suga Test Instruments Co., Ltd. for 3000 hours as an artificially accelerated exposure test by sunshine-type carbon arc according to the JIS A1415 measuring method.

Then an ultraviolet ray having a light intensity of 0.3mW/cm$^2$ at 365 nm was irradiated for 120 minutes, and the contact angle to water was measured after the irradiation by using Model CA-D manufactured by Kyowa Interface Science Co., Ltd. In the measurement, a spectrophotometer Model CM-3700d manufactured by Minolta Co., Ltd. was used, change of yellowness index was calculated from yellowness indexes measured according to the JIS K7105 measuring method before and after the artificially accelerated exposure test. The results are shown in Table 6.

TABLE 6

| Examples | Contact Angle to Water | Change of Yellowness Index |
|---|---|---|
| Example 1 | 5° | 2.0 |
| Example 2 | 8° | 4.5 |
| Example 3 | 7° | 3.1 |
| Example 4 | 9° | 5.8 |

As shown in Tables 4, 5 and 6, the transparent noise-barrier wall having titanium dioxide particles existing on the surface exhibited high transparency maintenance and the contamination was easily cleaned, even when fouled. Particularly, the transparent noise-barrier wall having titanium dioxide particles containing a large amount of brookite crystal was more excellent in these effects.

As described in the foregoing, the transparent noise-barrier wall of the present invention allows brookite crystal in 100% or titanium dioxide comprising the crystal to substantially exist on the surface, and results in high photocatalytic activity can be achieved, even with a very weak light intensity, for example, in the shadow between buildings. Therefore, the hydrophilization phenomenon of reducing the contact angle to water can be similarly exerted with a weak light intensity.

Furthermore, the transparent noise-barrier wall having titanium dioxide particles comprising brookite crystal existing on the surface of the present invention has good hydrophilicity and is readily wetted with water, and the substrate is entirely wetted with a small amount of water and the contamination can be easily cleaned when fouled.

In the transparent noise-barrier wall of the present invention, the noise-barrier substrate is a resin having high transparency, so that the above-described photocatalytic activity and hydrophilization performance can be effectively achieved even with light indirectly irradiated from the inside of the resin (from the substrate base).

As a result, even when the transparent noise-barrier wall of the present invention is fouled, the self-cleaning effect can be easily exerted and maintained over a long period of time. As the content of the brookite crystal in the titanium dioxide particles is larger, this effect is higher.

In the present invention, since the titanium dioxide particles comprising brookite crystal or the coating film containing these particles has excellent transparency, the transparency and appearance of the resin itself can be maintained. For example, when the noise-barrier substrate is an acrylic resin or a polycarbonate resin, the obtained noise-barrier wall having transparent titanium dioxide particles can have a total light transmittance of 86% or more.

While the invention has been described in detail and with reference to specific embodiments thereof, it will be apparent to one skilled in the art that various changes and modifications can be made therein without departing from the spirit and scope thereof.

What is claimed is:

1. A transparent noise-barrier wall comprising titanium dioxide particles comprising brookite titanium dioxide on a surface of the noise barrier wall, wherein the brookite titanium dioxide substantially exists on said surface, a surface layer having brookite titanium dioxide has a contact angle to water of about 10° or less with a light intensity of 3.5 to 0.005 mW/cm$^2$, the titanium dioxide particles comprise brookite crystal and at least one crystal selected from the group consisting of rutile crystal and anatase crystal, and the titanium dioxide particles comprise about 20% by mass or more of brookite titanium dioxide.

2. The transparent noise-barrier wall as claimed in claim 1 wherein the contact angle to water 96 hours after irradiation is about 10° or less.

3. The transparent noise-barrier wall as claimed in claim 1, wherein the titanium dioxide particles comprise about 50% by mass or more of brookite titanium dioxide.

4. The transparent noise-barrier wall as claimed in claim 1 wherein said titanium dioxide particles are fixed to the surface together with a binder material.

5. The transparent noise-barrier wall as claimed in claim 1 wherein a coating layer comprising said titanium dioxide particles and a binder material has a thickness of about 0.005 μm or more.

6. The transparent noise-barrier wall as claimed in claim 1, wherein a coating layer has a thickness of about 0.005 to about 10 μm.

7. The transparent noise-barrier wall as claimed in claim 1, wherein a substrate of said transparent noise-barrier wall comprises an acrylic resin or a polycarbonate resin.

8. The transparent noise-barrier wall as claimed in claim 1, wherein said titanium dioxide particles are fixed to the surface together with a binder material comprising at least one metal element-oxygen element bond selected from the group consisting of Si—O bond, Ti—O bond, Al—O bond, Zr—O bond, Ca—O bond and Mg—O bond.

9. The transparent noise-barrier wall as claimed in claim 1, wherein the brookite titanium dioxide is fixed onto the surface of a resin substrate through an undercoat material.

10. A soundproof panel unit which constitutes the transparent noise-barrier wall described in claim 1.

11. A transparent noise-barrier wall comprising titanium dioxide particles comprising brookite titanium dioxide on a surface of the noise barrier wall, wherein the brookite titanium dioxide substantially exists on said surface, and, wherein a surface layer having brookite titanium dioxide has a property such that the total light transmittance after a contamination cleaning test is about 86% or more.

12. The transparent noise-barrier wall as claimed in claim 11, wherein the titanium dioxide particles comprise about 20% by mass or more of brookite titanium dioxide.

13. The transparent noise-barrier wall as claimed in claim 11, wherein the titanium dioxide particles comprise about 50% by mass or more of brookite titanium dioxide.

14. The transparent noise-barrier wall as claimed in claim 11, wherein the titanium dioxide particles comprise about 100% by mass of brookite titanium dioxide.

15. The transparent noise-barrier wall as claimed in claim 11, wherein said titanium dioxide particles comprise brookite crystal and at least one crystal selected from the group consisting of rutile crystal and anatase crystal.

16. The transparent noise-barrier wall as claimed in claim 11, wherein said titanium dioxide particles are fixed to the surface together with a binder material.

17. The transparent noise-barrier wall as claimed in claim 11, wherein a coating layer comprising said titanium dioxide particles and a binder material has a thickness of about 0.005 μm or more.

18. The transparent noise-barrier wall as claimed in claim 11, wherein a coating layer has a thickness of about 0.005 to about 10 μm.

19. The transparent noise-barrier wall as claimed in claim 11, wherein a substrate of said transparent noise-barrier wall comprises an acrylic resin or a polycarbonate resin.

20. The transparent noise-barrier wall as claimed in claim 11, wherein said titanium dioxide particles are fixed to the surface together with a binder material comprising at least one metal element-oxygen element bond selected from the group consisting of Si—O bond, Ti—O bond, Al—O bond, Zr—O bond, Ca—O bond and Mg—O bond.

21. The transparent noise-barrier wall as claimed in claim 11, wherein the brookite titanium dioxide is fixed onto the surface of a resin substrate through an undercoat material.

22. A soundproof panel unit which constitutes the transparent noise-barrier wall described in claim 11.

23. A transparent noise-barrier wall comprising titanium dioxide particles comprising brookite titanium dioxide on a surface of the noise barrier wall, wherein the brookite titanium dioxide substantially exists on said surface, and, wherein a surface layer having brookite titanium dioxide has a property such that the haze value after a contamination cleaning test is from 0% to about 10%.

24. The transparent noise-barrier wall as claimed in claim 23, wherein the titanium dioxide particles comprise about 20% by mass or more of brookite titanium dioxide.

25. The transparent noise-barrier wall as claimed in claim 23, wherein the titanium dioxide particles comprise about 50% by mass or more of brookite titanium dioxide.

26. The transparent noise-barrier wall as claimed in claim 23, wherein the titanium dioxide particles comprise about 100% by mass of brookite titanium dioxide.

27. The transparent noise-barrier wall as claimed in claim 23, wherein said titanium dioxide particles comprise brookite crystal and at least one crystal selected from the group consisting of rutile crystal and anatase crystal.

28. The transparent noise-barrier wall as claimed in claim 23, wherein said titanium dioxide particles are fixed to the surface together with a binder material.

29. The transparent noise-barrier wall as claimed in claim 23, wherein a coating layer comprising said titanium dioxide particles and a binder material has a thickness of about 0.005 μm or more.

30. The transparent noise-barrier wall as claimed in claim 23, wherein a coating layer has a thickness of about 0.005 to about 10 μm.

31. The transparent noise-barrier wall as claimed in claim 23, wherein a substrate of said transparent noise-barrier wall comprises an acrylic resin or a polycarbonate resin.

32. The transparent noise-barrier wall as claimed in claim 23, wherein said titanium dioxide particles are fixed to the surface together with a binder material comprising at least one metal element-oxygen element bond selected from the group consisting of Si—O bond, Ti—O bond, Al—O bond, Zr—O bond, Ca—O bond and Mg—O bond.

33. The transparent noise-barrier wall as claimed in claim 23, wherein the brookite titanium dioxide is fixed onto the surface of a resin substrate through an undercoat material.

34. A soundproof panel unit which constitutes the transparent noise-barrier wall described in claim 23.

35. A transparent noise-barrier wall comprising titanium dioxide particles on a surface of the noise barrier wall, wherein the titanium dioxide particles comprise about 20% by mass or more of brookite titanium dioxide, and the titanium dioxide brookite particles comprise brookite crystal and at least one crystal selected from the group consisting of rutile crystal and anatase crystal.

36. The transparent noise-barrier wall as claimed in claim 35, wherein the titanium dioxide particles comprise about 50% by mass or more of brookite titanium dioxide.

37. The transparent noise-barrier wall as claimed in claim 35, wherein said titanium dioxide particles are fixed to the surface together with a binder material.

38. The transparent noise-barrier wall as claimed in claim 35, wherein a coating layer comprising said titanium dioxide particles and a binder material has a thickness of about 0.005 μm or more.

39. The transparent noise-barrier wall as claimed in claim 35, wherein a coating layer has a thickness of about 0.005 to about 10 μm.

40. The transparent noise-barrier wall as claimed in claim 35, wherein a substrate of said transparent noise-barrier wall comprises an acrylic resin or a polycarbonate resin.

41. A method for producing a transparent noise-barrier wall having a photocatalytic activity, comprising coating a coating agent of titanium dioxide particles containing about 20% by mass or more of brookite titanium dioxide on a surface of a substrate of the transparent noise-barrier wall, and wherein the titanium dioxide brookite particles comprise brookite crystal and at least one crystal selected from the group consisting of rutile crystal and anatase crystal.

42. The method for producing a transparent noise-barrier wall having a photocatalytic activity as claimed in claim 41, wherein the substrate of the transparent noise-barrier wall is an acrylic resin or a polycarbonate resin.

43. A transparent noise-barrier wall, comprising titanium dioxide particles comprising brookite titanium dioxide on a surface of the noise barrier wall, wherein the brookite titanium dioxide substantially exists on said surface, and, wherein a surface layer having brookite titanium dioxide has a contact angle to water of about 10° or less with a light intensity of 3.5 to 0.005 mW/cm$^2$ and wherein the transparent noise-barrier wall has a property such that change of the yellowness index after an artificially accelerated exposure test by sunshine-type carbon arc for 3000 hours is about 7 or less.

44. The transparent noise-barrier wall as claimed in claim 35, wherein said titanium dioxide particles are fixed to the surface together with a binder material comprising at least one metal element-oxygen element bond selected from the group consisting of Si—O bond, Ti—O bond, Al—O bond, Zr—O bond, Ca—O bond and Mg—O bond.

45. The transparent noise-barrier wall as claimed in claim 35, wherein the brookite titanium dioxide is fixed onto the surface of a resin substrate through an undercoat material.

46. A soundproof panel unit which constitutes the transparent noise-barrier wall described in any one of claims 35.

* * * * *